July 1, 1924.

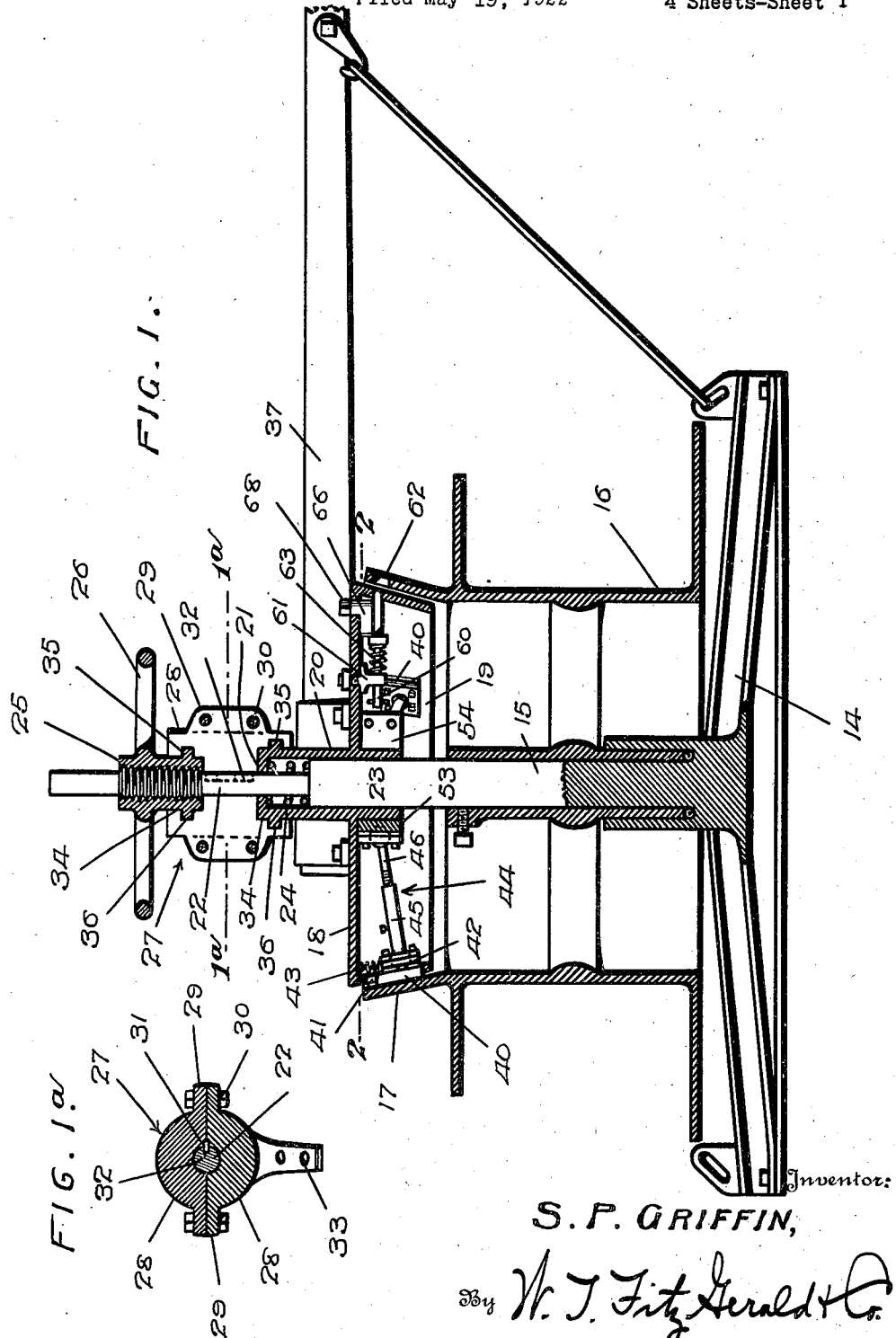

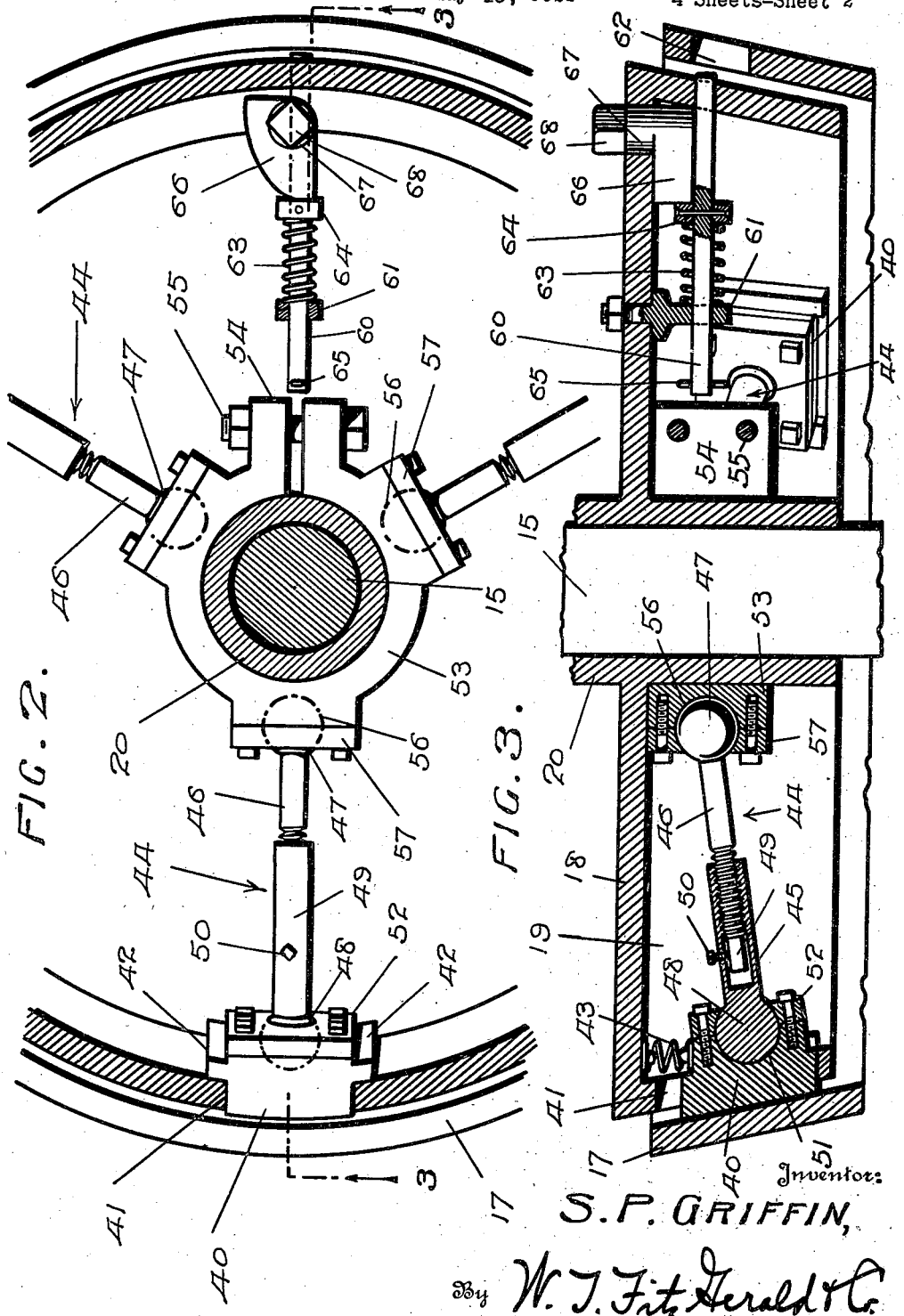

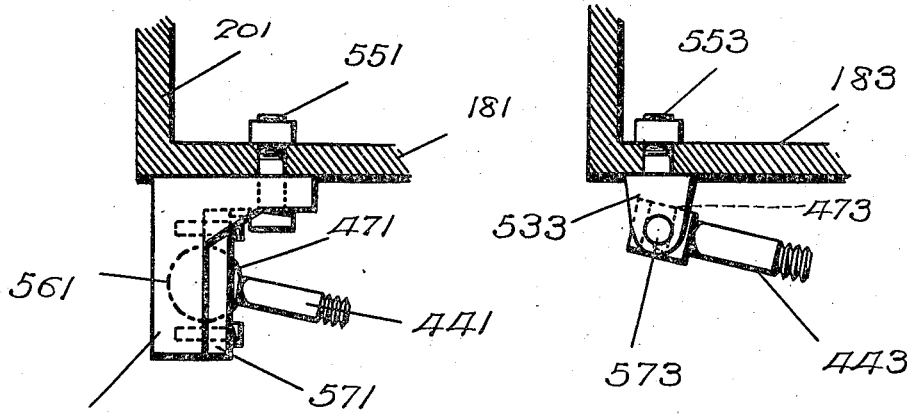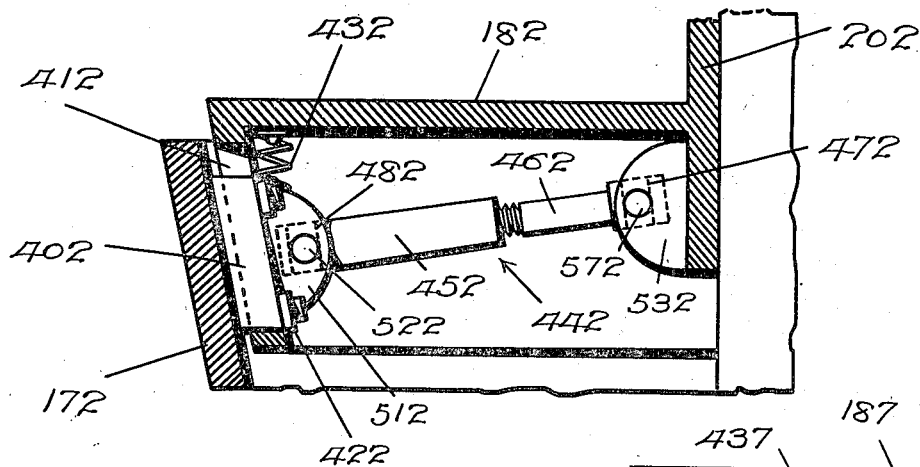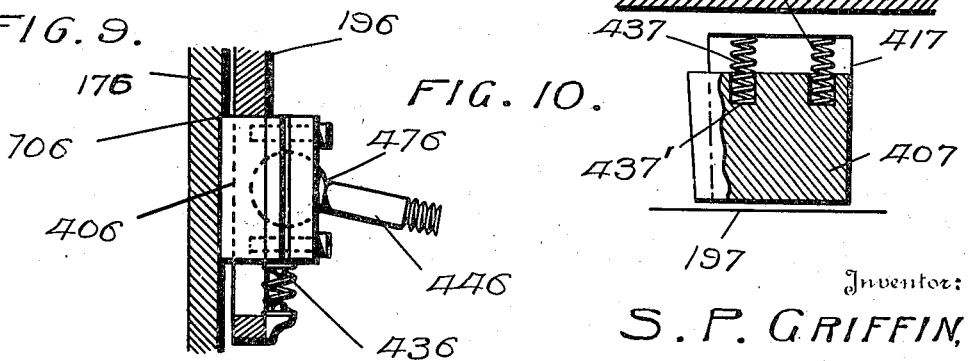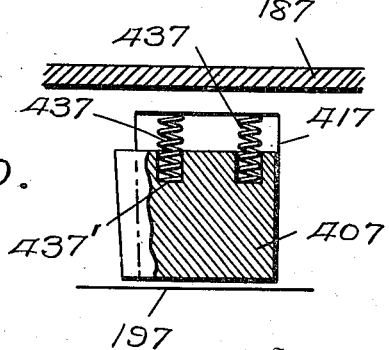

S. P. GRIFFIN

CLUTCH

Filed May 19, 1922  4 Sheets-Sheet 4

1,499,652

Inventor:
S. P. GRIFFIN,
By W. J. Fitz Gerald & Co.
Attorney.

Patented July 1, 1924.

1,499,652

UNITED STATES PATENT OFFICE.

SAMUEL P. GRIFFIN, OF NORTH JUDSON, INDIANA.

CLUTCH.

Application filed May 19, 1922. Serial No. 562,163.

*To all whom it may concern:*

Be it known that I, SAMUEL P. GRIFFIN, a citizen of the United States, residing at North Judson, in the county of Starke and State of Indiana, have invented certain new and useful Improvements in Clutches; and I do hereby declare the following to be a full, clear, and exact description of the invention, such as will enable others skilled in the art to which it appertains to make and use the same.

The present invention relates to clutches, and aims to provide a novel and improved clutch device adapted especially for use in capstans of the kind disclosed in my Patent No. 1,372,019, granted March 22, 1921, and in the co-pending application, Serial No. 487,793, filed July 26, 1921, although the improvements can be used for other appropriate purposes also.

It is an object of the invention to provide a clutch having novel and effective means for causing the clutch members to tightly frictionally grip one another, using a toggle action to obtain the desired results.

Another object is the provision of a novel and improved toggle arrangement in the clutch for obtaining a powerful frictional grip between the clutch members.

A further object is the provision of a novel means for latching the clutch members together for rotation one with the other without possibility of slippage.

A still further object is the provision of a novel operative connection between one clutch member and the operating member.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a vertical section of a capstan embodying the improved clutch device, portions being shown in elevation.

Fig. 1ª is a cross section on the line 1ª—1ª of Fig. 1.

Fig. 2 is an enlarged horizontal section on the line 2—2 of Fig. 1, portions being broken away.

Fig. 3 is a vertical section on the line 3—3 of Fig. 2.

Figs. 4, 5, 6 and 7 are sectional details showing different modifications.

Fig. 9 is a sectional detail showing a further variation.

Fig. 10 is a sectional detail of another modification.

Figure 7:
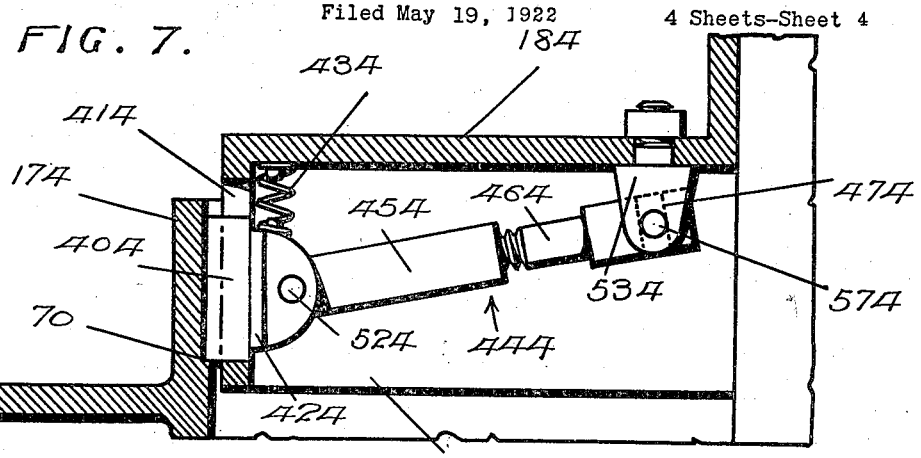

The improvements, as illustrated in the drawings are especially adapted for use in capstans, although they can be used in other devices or appliances, for which the improvements are suitable.

Fig. 1 illustrates a capstan of the general kind shown in Patent No. 1,372,019, embodying a suitable base or frame 14 having the upstanding spindle 15 on which the drum or spool 16 is mounted for rotation for winding a cable thereon. This drum is provided at the top, above the upper rim of the drum, with an annular inclined or flared flange 17 providing a conical clutch socket. A clutch member or disk 18 is mounted for rotation on the spindle 15 above the drum, and is provided with a depending annular flange or rim 19, which is inclined or bevelled to provide a conical periphery to correspond with and fit the companion clutch member or flange 17 within which the flange 19 is disposed. The confronting surfaces of the flanges may have frictional facings to assure their frictional engagement.

The actuating means of the clutch member 18 is connected to the hub 20 thereof which is slidable and rotatable on the spindle 15. The hub 20 is provided at its upper end with an inturned flange 21 slidably fitting the upper reduced portion or stem 22 of the spindle, and a coiled spring 24 surrounds said stem 22 and is confined between the flange 21 and the shoulder 23 of the spindle 15 within the hub 20, thereby exerting an effort to raise the clutch member 18 and open the clutch. A nut 25 is screw-threaded on the stem 22 of the spindle above the hub 20, and provides the operating member for the clutch, said nut being preferably the hub of a hand wheel 26, which can be conveniently rotated for controlling the clutch. A swivel connection is provided between the nut or hub 25 and the hub 20 of the clutch member 18, and includes a coupling member or sleeve 27 fitted slidably on the stem 22 between the hubs 20 and 25. Said member or sleeve 27 is split diametrically into two sections 28, which have the outstanding flanges 29 secured together, as at 30. The member or sleeve 27 can thus be conveniently applied to the stem 22 between the hubs 20 and 25. A key or feather 31 is clamped between the sections 29 and engages in a longitudinal keyway or groove 32 in the stem 22, to prevent the rotation of the sleeve 27, but to permit it to slide longitudinally of the stem. The upper and lower end portions of the sleeve 27 have sockets or recesses 34 receiving the adjacent end portions of the hubs 20 and 25, and said sleeve has annular grooves 35 surrounding said sockets in which outstanding annular flanges or ribs 36 of the hubs 20 and 25 are fitted, thereby swivelling the hubs in the sleeve or member 27, and connecting the parts for simultaneous movement longitudinally of the spindle. In this way, the operating member or wheel 26 and clutch member 18 are both assembled with the coupling sleeve or member 27 by swivel connections. One section 28 of the sleeve 27 has an outstanding bracket 33 to which a seat for the operator can be secured, as disclosed in the co-pending application Serial No. 487,793. The clutch member 18 is rotated in any suitable manner. As shown, a pole or sweep 37 is connected to the clutch member 18 for turning it.

The clutch member 18 is provided with shoes 40 to frictionally engage the clutch member 17 under radial pressure. As shown more in detail in Figs. 2 and 3, the shoes 40 are fitted for sliding movement in openings 41 in the rim or flange 19. Said shoes are rotatable with the clutch member 18 but are slidable radially thereof and longitudinally of the axis of the clutch. Said shoes have their faces projecting from the periphery of the clutch member 18 to contact with the face of the clutch member 17 before the periphery of the clutch member 17 engages the clutch member 17, and the shoes 40 have stop flanges or lugs 42 at opposite sides to bear against the rim or flange 19 for limiting the outward movement of the shoes in the openings 41. Coiled springs 43 are disposed between the shoes 40 and the clutch member 18, for normally moving said shoes in one direction (downwardly as shown), and said shoes have toggle connections with the clutch member 18 for thrusting the shoes radially outward with considerable pressure when the clutch members are moved together. Thus, a toggle link 44 is disposed between each shoe 40 and the hub 20 of the clutch member 18, and such link, as shown in Figs. 1, 2 and 3, is composed of the tubular section 45 into which the other section 46 is screw-threaded, for purposes of adjustment, to change the length of the link. The sections 45 and 46 have the balls or heads 48 and 47 at their opposite ends, and the section 46 has its inner terminal of square or flat sided form, as at 49, for the engagement of a set screw 50 carried by the section 45. Said screw can be screwed against the flat-sided portion 49 after the sections have been adjusted, for maintaining the adjustment, by preventing the rotation of the sections relatively to one another. The ball 48 of each link 44 seats in a socket 51 in the corresponding shoe 40, and a retainer 52 is secured to the shoe around the ball, to hold the link and shoe assembled with a "ball and socket" joint, permitting the link and shoe to swing and turn relatively. A band 53 embraces the hub 20 below the member 18, and is split and has the outstanding ears 54 at its ends through which a bolt 55 engages, for clamping said band securely in place. The band 53 has sockets 56 receiving the balls 47, and retainers 57 are secured to said band around the balls to provide ball and socket connections between the links 44 and the band.

The inner ends or balls 47 of the toggle links 44, when the clutch is open, are above the plane of the outer ends or balls 48 of the links, and the clutch member 18 being raised, results in the springs 43 moving the shoes 40 downwardly to releasing position. When the clutch member 18 is forced downwardly, by the rotation of the nut or hub 25 of the wheel 26, the shoes 40 in contacting with the clutch member 17 will be stopped in their downward movement, and the pressure on the inner ends of the links 44 will move said inner ends of the links downwardly or toward the plane of the outer ends of the links, thereby creating a toggle action, and forcing the toggle links radially outward with considerable pressure. This will force the shoes 40 under high outward pressure or thrust against the clutch member 17, whereby the shoes grip said clutch member in a powerful manner, to prevent slipping. When the pressure is relieved, by raising the clutch member 18, the inner ends of the links being raised, will enable the shoes 41 to yield inwardly, and the springs 43 will move the shoes 40 downwardly away from the clutch member 18, so that the clutch members are disengaged. The friction grip can be regulated, by adjusting the lengths of the toggle links 44, to take up wear on the shoes 40, or to adjust the pressure of the shoes against the outer clutch member.

A latching device is provided for latching the two clutch members together for rotation one with the other, and includes a latch 60 slidable radially of the clutch member 18 in the rim or flange 19 thereof and in a depending guide 61 secured to said clutch member. The clutch member 17 has a vertical slot 62 for receiving the outer end of said latch when it is projected from the clutch member 18. A coiled spring 63 surrounds said latch and is confined between the guide 61 and a collar 64 secured on the latch, whereby to project the latch when it is released. A stop pin 65 carried by the latch is adapted to contact with the guide 61, to limit the outward movement of the latch. The latch is retracted by means of a cam 66 disposed above the latch between the latch and clutch member 18 adjacent to the rim 19, and said cam has an upstanding stud 67 projecting through the clutch member and mounting the cam for turning movement. Said stud has a squared wrench-engageable portion 68 projecting above the clutch member, for the engagement of a wrench or handle used for turning the cam. When the cam is turned in one direction, it contacts with the collar 64 and forces the latch inwardly to retracted position, and holds it in this position, as seen in Figs. 2 and 3. When the cam is turned in the opposite direction, the latch is released and the spring 63 will project it against the clutch member 17, said latch springing or snapping into the slot 62 when the latch and slot register, thereby causing both clutch members to turn one with the other, without any liability of slippage occurring.

Figure 4 shows another means for connecting the links 441 with the clutch member 181 when the hub 201 does not extend below the clutch member. The ball 471 of the link 441 is fitted in a socket 561 of a rigid hanger or depending bracket 531 which is clamped up against the clutch member, by the bolt 551. The ball 471 is held in the socket 561 by a retainer 571. Each link can thus be connected by a ball and socket connection with the clutch member by an individual hanger or bracket 531, instead of using the clamp band 53 as in Figs. 1, 2 and 3.

Fig. 5 shows another modification. The link 442 is composed of the tubular section 452 and section 462 threaded into said tubular section, and the outer end portion of the link is pivoted by a pin 522 to an ear or lug 512 of the shoe 402 which slides in the opening 412 of the clutch member 182 to contact with the outer clutch member 172. Stop lugs 422 are secured to the inner side of the shoe, to limit the outward movement of the shoe, and a spring 432 is disposed between the clutch member and shoe as in the first form of clutch. The inner end of the link is pivoted by a pin 572 to an ear 532 projecting from the lower portion of the hub 202. The end portions of the link have the openings 472 and 482, respectively, extending diametrically therethrough in different directions, for receiving the pivot pins. When the pins are removed, the sections of the link 442 can be rotated relatively for the purpose of adjusting the length of the link, and when the pivot pins are inserted, this will not only pivotally connect the link with the clutch member and shoe, but will also prevent accidental adjustment of the link.

Fig. 6 shows the link 443 connected by a similar pivot pin 573 with a depending bearing 533 having a stem 553 secured through and clamped to the clutch member 183. The end of the link 443 has the openings 473 for receiving the pin 573.

Fig. 7 shows the rim or flange 194 of the clutch member 184 and the clutch member or flange 174 of cylindrical form, instead of being tapered or conical. The clutch shoe 404 is fitted for vertical and radial sliding movement in the slot or opening 414, and is depressed by a spring 434 between the shoe and clutch member 184, the shoe having the stop flanges or lugs 424 to contact with the inner periphery of the rim 194. The link 444 composed of the screw-threadedly connected sections 454 and 464 has its outer end connected by a pivot pin 524 with the shoe, and its inner end portion is connected by a pivot pin 574 with a depending bearing 534 secured to the clutch member 184 in substantially the same manner as shown in Fig. 6. The section 464 has the openings 474 to receive the pivot 574, so that when the pivot pin is removed, the section 464 can be turned for adjusting the length of the link. When using the cylindrical confronting surfaces of the clutch members, the outer clutch member 174 is provided with a shoulder 70 for the contact of the shoe or shoes 404, when the clutch members are moved together, so that the shoes will be stopped while the clutch member 184 continues to move, for creating the outward thrust on the shoe.

Figure 8:
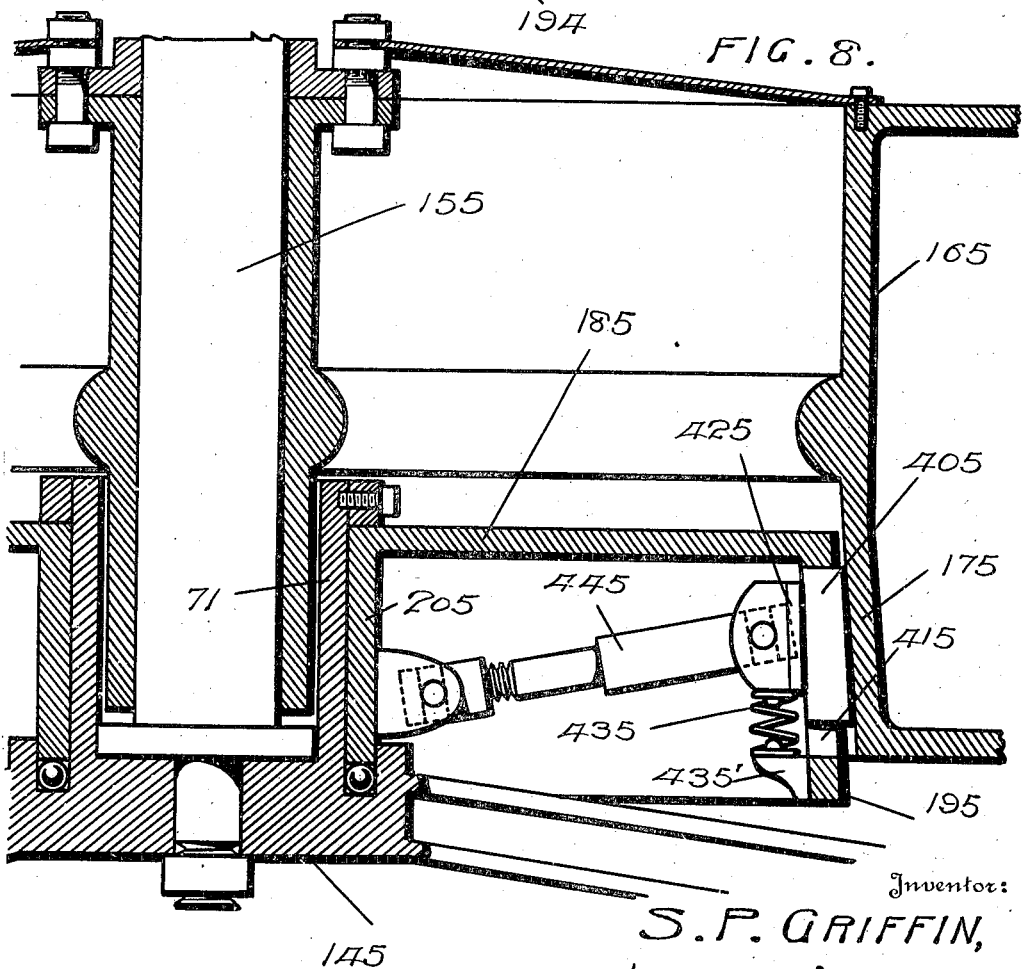
Fig. 8 is a fragmentary vertical section of another type of capstan showing a modified form of clutch at the bottom of the drum.

Fig. 8 illustrates the clutch embodied in a capstan of the kind shown in co-pending application Serial No. 487,793, wherein the clutch member 185 is located at the bottom of the drum 165. The rim or flange 195 of the clutch member is located within the lower portion of the drum, which has the tapered or conical clutch portion or member 175 to correspond with the tapered or conical rim 195 of the clutch member 185. The shoe 405 is movable in the opening 415 of the rim 195, and has the stop flange or flanges 425 to contact with the inner periphery of said rim. A coiled spring 435 is disposed between the shoe and spring seat 435' carried by the rim 195 below the shoe, whereby the shoe is raised when released. A toggle link 445 is pivotally connected at its outer end to the shoe and at its inner end to the hub 205 of the clutch member 185, in substantially the same manner as suggested in Fig. 5, excepting that the link is lower at its inner end than its outer end, just reversed to the arrangements hereinbefore described. The hub 205 rotates around an upstanding sleeve 71 rising from the base 145. In this arrangement, the drum 165 is raised and lowered for opening and closing the clutch, respectively, and when the drum is forced downwardly, the clutch portion 175 thereof contacts with the shoe or shoes 405 and moves the same downwardly, whereby the downward swinging movement of the link 445 will provide the toggle action for thrusting the shoe outwardly to tightly grip the clutch portion 175. The action is substantially the same as hereinbefore described, excepting that the outer clutch member is moved instead of the inner clutch member.

Fig. 9 illustrates the rim 196 of the inner clutch member and the clutch portion 176 of the drum as being cylindrical, and the clutch portion 176 is provided with an inner shoulder 706 to contact with the shoe 406, which is necessary to cause the shoe to move with the clutch portion 176, when the clutch members are not tapered or conical. The shoe 406 is raised by the spring 436, and, as shown the link 446 has a ball 476 fitted in a socket in the shoe, to provide a ball and socket connection.

Fig. 10 shows the springs 437 between the shoe 407 and upper edge of the opening 417 in which the shoe is disposed, the upper edge portion of the shoe having the recesses 437' receiving said springs. The springs can thus be conveniently disposed within the opening 417 of the rim or flange 197 of the clutch member 187.

Having thus described the invention, what is claimed as new is:

A clutch device comprising a rotary member having an annular flange, a rotary disk having an annular flange within the aforesaid flange and provided with openings, shoes slidably mounted in said openings for movement toward and away from the disk and for movement toward and away from the center of the disk, said shoes having portions to bear against the inner surface of the second named flange for limiting the outward movement of said shoes, toggle link connections between said shoes and disk to force the shoes into engagement with the first-named flange when the flanges are moved together, and spring means for urging the shoes toward said member in said openings.

In testimony whereof I have signed my name to this specification in the presence of two subscribing witnesses.

SAMUEL P. GRIFFIN.

Witnesses:
CHAS. RUHL,
CHRISTINE KOZA.